United States Patent
Holthaus et al.

(10) Patent No.: US 11,332,200 B2
(45) Date of Patent: May 17, 2022

(54) HAUL TRUCK SPACE FRAME AND BODY SUPPORT ARRANGEMENT

(71) Applicant: Caterpillar Inc., Peoria, IL (US)

(72) Inventors: David W Holthaus, Monticello, IL (US); Andres Munoz-Najar, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 266 days.

(21) Appl. No.: 16/664,009

(22) Filed: Oct. 25, 2019

(65) Prior Publication Data

US 2021/0122430 A1    Apr. 29, 2021

(51) Int. Cl.
| | | |
|---|---|---|
| *B62D 33/02* | (2006.01) | |
| *B60P 1/04* | (2006.01) | |
| *B62D 23/00* | (2006.01) | |

(52) U.S. Cl.
CPC ............... *B62D 33/02* (2013.01); *B60P 1/04* (2013.01); *B62D 23/005* (2013.01)

(58) Field of Classification Search
CPC .... B62D 33/02; B62D 47/003; B62D 33/037; B62D 23/005; B62D 25/2054; B62D 33/0273; B62D 33/08
USPC ........... 298/17 R, 22 R, 1 R, 7, 18, 1 B, 1 H, 298/19 R, 23 D, 23 DF, 23 R; 296/183.2, 296/183.1, 184.1, 26.11, 24.43, 64, 66, 296/98, 65.16, 39.1, 37.1
See application file for complete search history.

(56) References Cited

U.S. PATENT DOCUMENTS

| | | | | |
|---|---|---|---|---|
| 2,731,293 A | * | 1/1956 | Hutchinson | B60P 1/16 298/22 P |
| 6,592,172 B2 | * | 7/2003 | Fujan | B60P 1/283 296/183.2 |
| 8,398,152 B1 | * | 3/2013 | Mazur | B62D 21/152 296/187.09 |
| 8,882,178 B2 | * | 11/2014 | Kitaguchi | B60P 1/28 296/183.2 |

(Continued)

FOREIGN PATENT DOCUMENTS

| | | |
|---|---|---|
| CN | 204383270 | 6/2015 |
| CN | 103043103 B | 5/2016 |

(Continued)

*Primary Examiner* — D Glenn Dayoan
*Assistant Examiner* — Sunsurraye Westbrook
(74) *Attorney, Agent, or Firm* — Oblon, McClelland, Maier & Neustadt

(57) ABSTRACT

A support arrangement for a haul truck comprises a space frame and a dump body operatively positioned on the space frame according to defined contact points. The space frame can include at least one rear support, at least one outer elongate support member, and at least one support rocker configured to pivot laterally about an axis. The dump body can include on a bottom thereof a rear pivot support and at least one flat contact surface, and on a front face thereof at least one vertical support structure. Each rear support of the space frame is configured to be pivotally coupled to the rear pivot support of the dump body. Each vertical support structure of the dump body is configured to be removably seated in a corresponding support rocker. Each flat contact surface is configured to be positioned adjacent to an outer lateral surface of an outer elongate support member.

13 Claims, 7 Drawing Sheets

(56) References Cited

U.S. PATENT DOCUMENTS

| | | | | |
|---|---|---|---|---|
| 8,882,179 B2 * | 11/2014 | Kitaguchi | ............... | B60P 1/286 |
| | | | | 296/183.2 |
| 9,963,094 B2 | 5/2018 | Richthammer | | |
| 2016/0039463 A1 * | 2/2016 | Ormiston | ............... | B62D 21/08 |
| | | | | 298/17 R |
| 2018/0312096 A1 | 11/2018 | Ratcliffe | | |

FOREIGN PATENT DOCUMENTS

| | | |
|---|---|---|
| JP | 62025234 | 2/1987 |
| JP | 62210145 | 9/1987 |
| JP | 2011240818 | 12/2011 |
| JP | 2012025285 A | 2/2012 |
| KR | 199839435 | 9/1998 |
| WO | 2019110019 | 6/2019 |

* cited by examiner

HAUL TRUCK SPACE FRAME AND BODY SUPPORT ARRANGEMENT

TECHNICAL FIELD

The present disclosure relates to haul trucks, and more particularly to space frame and body support arrangements for haul trucks, and systems, components, and methods thereof.

BACKGROUND

Conventionally, rear haul trucks have a dump body pivotally connected to a haul truck frame adjacent to a rear end of the dump body. A problem can arise with regard to connection between the dump body and the haul truck frame. The connection between the dump body and the haul truck frame can provide for load support points. These load support points can be sensitive to constraints such as manufacturing variations, poor maintenance practices, and/or unreliable support definition. This can lead to added reinforcement of multiple load paths.

Additionally, conventional space frames for haul trucks may be configured with static applications in mind. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain.

JP 2012-025285 ("the '285 JP patent document") describes a dump truck in which a member other than a hinge can support at least a front-direction inertia force among inertia forces acting on a cargo bed thereof. According to the '285 JP patent document, the dump truck includes a frame, hinge pins arranged on a rear part of the frame, and the cargo bed attached freely turnably to the frame via the hinge pins. The '285 JP patent document also describes that a front stopper structure is disposed on the frame, that the front stopper structure is for supporting the front-direction inertia force acting on the cargo bed by abutting against a front part of the cargo bed seated on the frame, and that the front stopper structure is configured in such a way that a front abutting plate which abuts against the front part of the cargo bed is turned by a four-bar linkage.

SUMMARY OF THE DISCLOSURE

In one aspect, a support arrangement for a haul truck is disclosed. The support arrangement can comprise a space frame and a dump body. The dump body can be configured to be positioned on the space frame. The space frame can include at least one rear support, at least one outer elongate support member extending lengthwise generally horizontally, and at least one support rocker configured to pivot laterally about an axis that extends horizontally in a length direction of the space frame. The dump body can include a rear pivot support having at least one rear pivot provided on a bottom the dump body, at least one flat, vertically oriented contact surface provided on the bottom of the dump body, and at least one vertical support structure extending from a front face of the dump body. The at least one rear support of the space frame can be configured to be pivotally coupled to the at least one rear pivot of the rear pivot support of the dump body, the at least one vertical support structure of the dump body can be configured to be removably seated in the at least one support rocker, and the at least one flat, vertically oriented contact surface can be configured to be positioned adjacent an outer lateral surface of the outer elongate support member.

In another aspect, a support system for a haul truck is disclosed. The support system can be comprised of a space frame and a dump body. The dump body can be operatively positioned on the space frame. The space frame can include a pair of rear supports at a rear of the space frame, the rear supports being spaced apart from each other in a width direction of the space frame; a pair of outer frame tubes extending lengthwise generally horizontally; and a pair of support rockers, the support rockers being spaced apart from each other in the width direction of the space frame and configured to pivot laterally about respective axes, the axes being parallel to each other. The dump body can include a rear pivot support provided on a bottom the dump body, the rear pivot support having a pair of rear pivots spaced apart from each other in a width direction of the dump body; a pair of flat contact surfaces provided on the bottom of the dump body, the flat contact surfaces being vertically oriented and spaced apart from each other in the width direction of the dump body; and a pair of vertical support structures extending from a front face of the dump body, the pair of vertical support structures being spaced apart from each other in the width direction of the dump body, and each vertical support structure having a down-facing contact surface. The rear supports of the space frame can be pivotally coupled to the rear pivots of the rear pivot support of the dump body, the vertical support structures of the dump body can be removably seated in the support rockers, and the flat contact surfaces can be positioned adjacent outer lateral surfaces of the outer frame tubes when the dump body of the haul truck is in a rest position.

And in yet another aspect, an off-highway rear haul truck is disclosed. The off-highway rear haul truck can be comprised of a space frame having a length and a width and a dump body having a length and a width. The dump body can contact the space frame according to a six-point contact arrangement. The space frame can include a pair of cylindrical rear supports at a rear of the space frame, the cylindrical rear supports having a first common axis and being spaced apart from each other in a width direction of the space frame; a pair of outer frame tubes, the outer frame tubes extending lengthwise generally horizontally in a length direction of the space frame; and a pair of support rockers, the support rockers being spaced apart from each other in the width direction of the space frame and configured to pivot in the width direction of the space frame about respective axes, the axes being parallel to each other and orthogonal to the first common axis of the cylindrical rear supports. The dump body can include a rear pivot support provided on a bottom the dump body and toward a rear of the dump body, the rear pivot support having a pair of cylindrical rear pivots, the cylindrical rear pivots having a second common axis and being spaced apart from each other in a width direction of the dump body; a pair of flat contact surfaces provided on the bottom of the dump body at a middle portion of the dump body, the flat contact surfaces being spaced apart from each other in the width direction of the dump body; and a pair of vertical support structures extending from a front face of the dump body, the pair of vertical support structures being spaced apart from each other in the width direction of the dump body. The six-point contact arrangement can include the pair of cylindrical rear supports of the space frame pivotally coupled to the pair of cylindrical rear pivots of the rear pivot support of the dump body, the pair of vertical support structures of the dump body removably seated in the pair of support rockers, and the pair of flat contact surfaces positioned adjacent outer lateral surfaces of the pair of outer frame tubes.

Other features and aspects of this disclosure will be apparent from the following description and the accompanying drawings.

DETAILED DESCRIPTION

Figure 1:
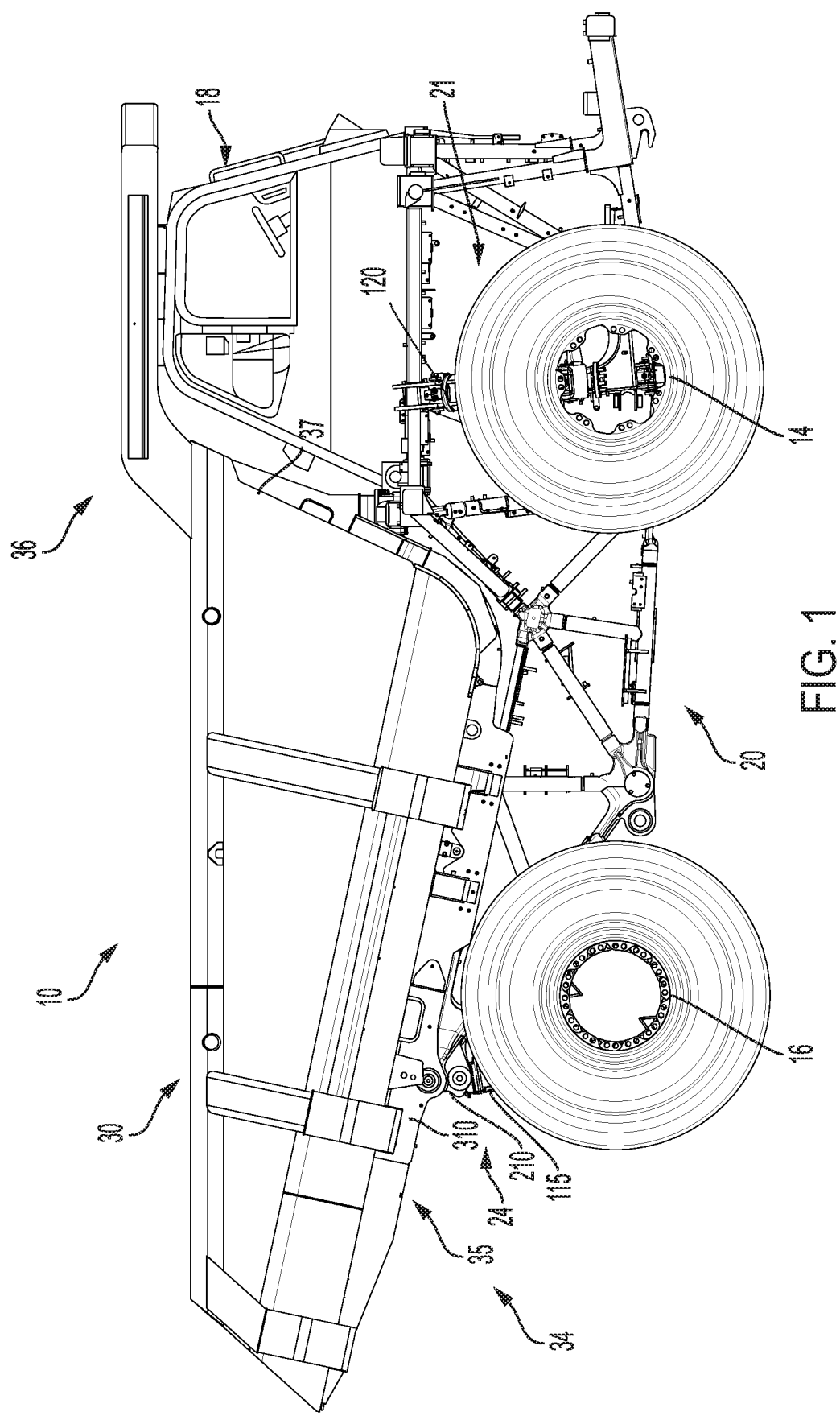
FIG. 1 is a side view of a machine according to embodiments of the disclosed subject matter.
Figure 2:
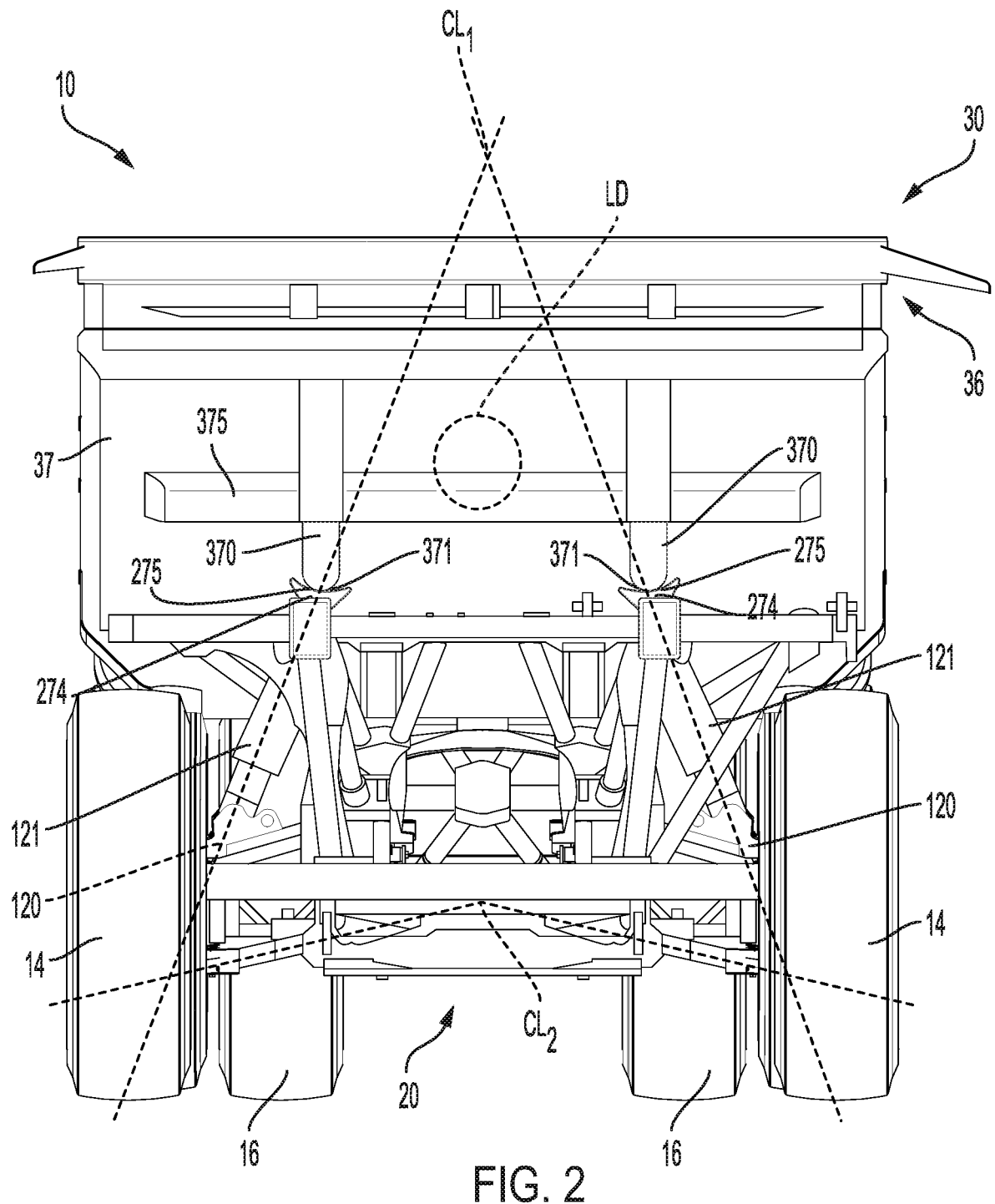
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30. Such heating configuration can be as set forth in U.S. application Ser. No. 16/663,692 filed Oct. 25, 2019 (Case 19-0765), which is incorporated herein by reference in its entirety.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
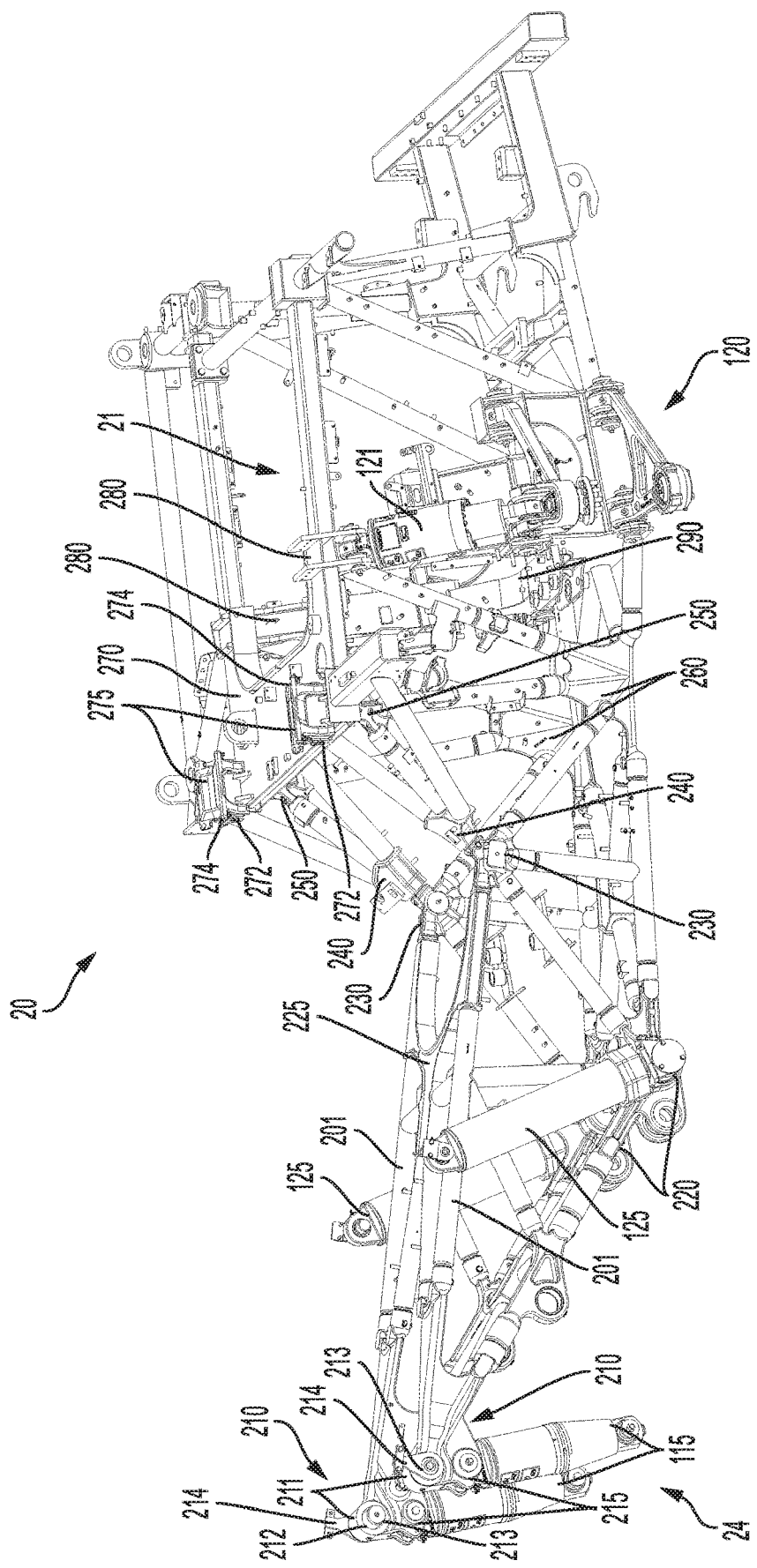
FIG. 3 is a side view of a space frame according to embodiments of the disclosed subject matter.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. application Ser. No. 16/663,892 filed Oct. 25, 2019 (Case 19-0767); the center upper horizontal frame connection 225 and corresponding connections can be as set forth in U.S. application Ser. No. 16/663,930 filed Oct. 25, 2019 (Case 19-0768); the center upper frame connections 230 and corresponding connections can be as set forth in U.S. application Ser. No. 16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); the front upper suspension connections 280 and corresponding connections can be as set forth in U.S. application Ser. No. 16/664,124 filed Oct. 25, 2019 (Case 19-0759); and/or the front lower suspension connection 290 and corresponding connections can be as set forth in U.S. application Ser. No. 16/664,169 filed Oct. 25, 2019 (Case 19-0760). The foregoing applications are incorporated herein by reference in their entireties.

The space frame 20 can also include a plurality of elongate support members, such as elongate support members 201. Elongate support members, according to embodiments of the disclosed subject matter, can be in the form of rods and/or tubes, circular, for instance, where some or all of the rods and/or tubes may be solid or hollow.

As shown in FIG. 3, each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 from the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

As shown in FIG. 3, the front upper frame connection 270 can be fixedly coupled to the front upper suspension connections 280, and a bottom of the front upper frame connection 270 can be fixedly coupled to the front upper frame connections 250. Additionally, the front upper frame connection 270, which may be a fabrication, can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30.

Turning now to FIGS. 4-7, the dump body 30 can have, on the bottom 35 thereof, a rear pivot support 310 and a pair of flat contact surfaces 301, and on the front wall 37 thereof, a pair of the vertical support structures 370.

Figure 4:
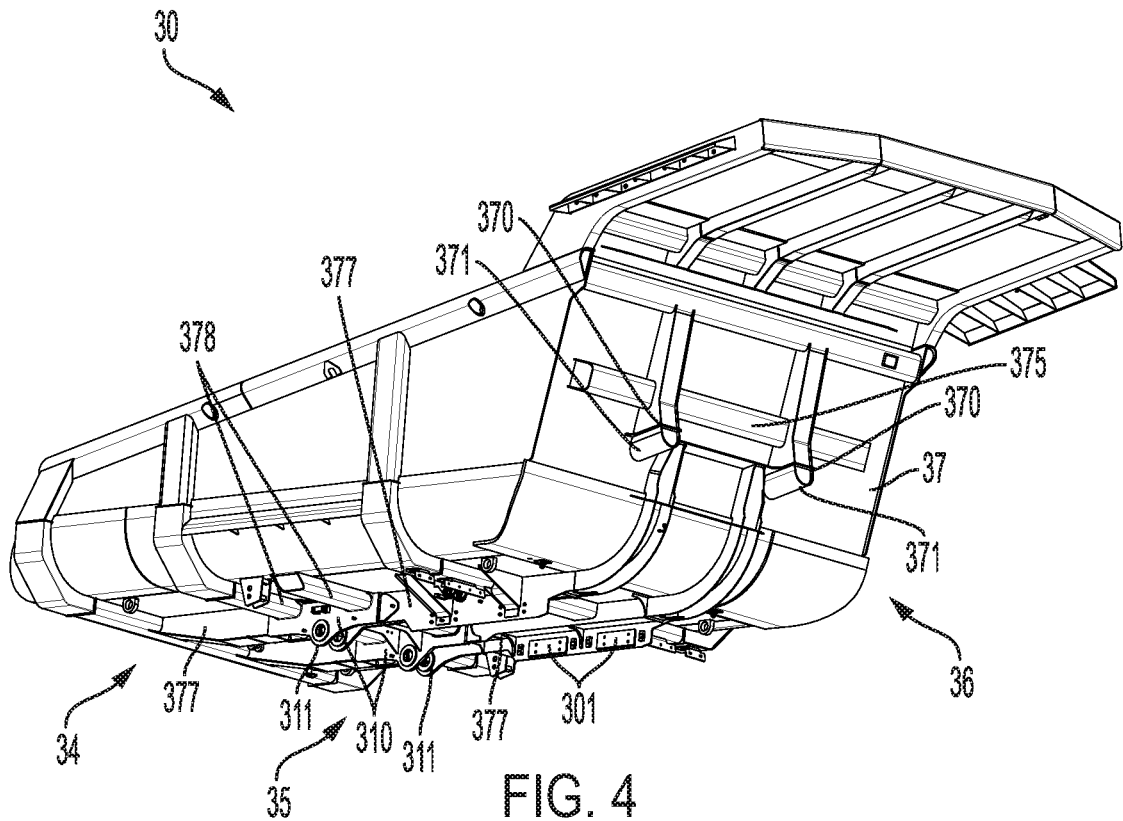
FIG. 4 is a front, side view of a dump body according to embodiments of the disclosed subject matter.
Figure 5:
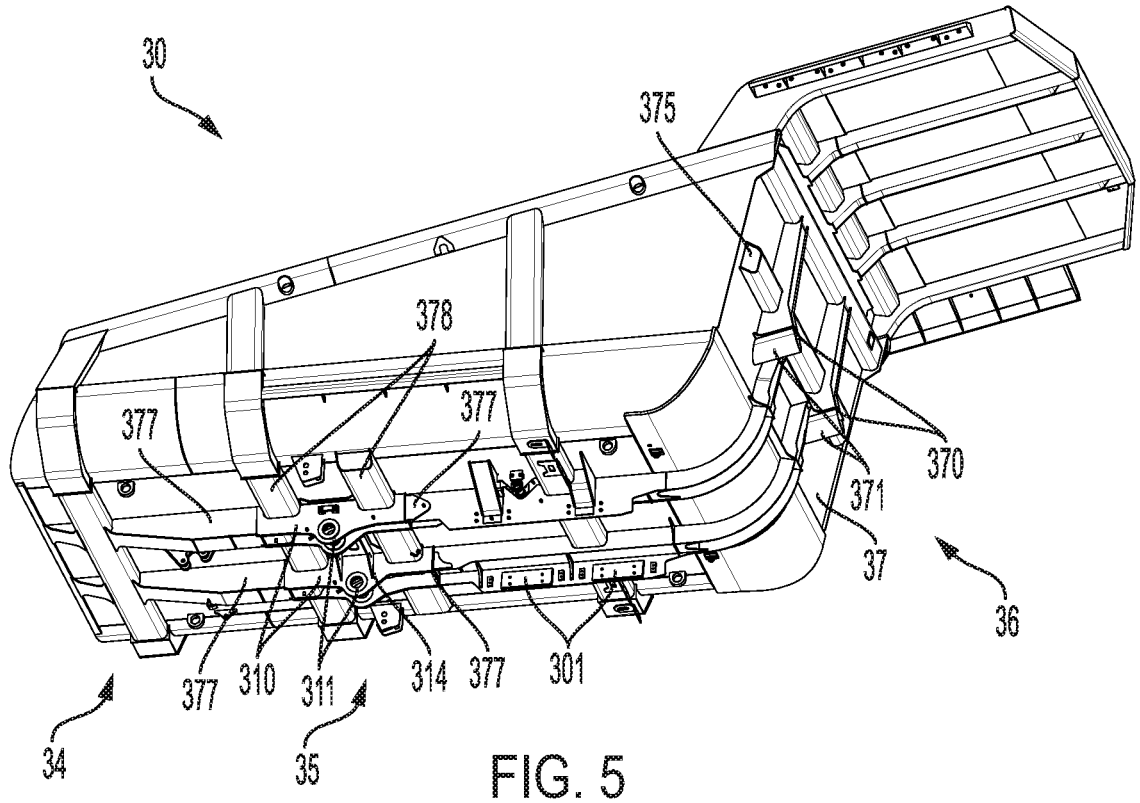
FIG. 5 is a bottom, side view of the dump body of FIG. 4.
Figure 6:
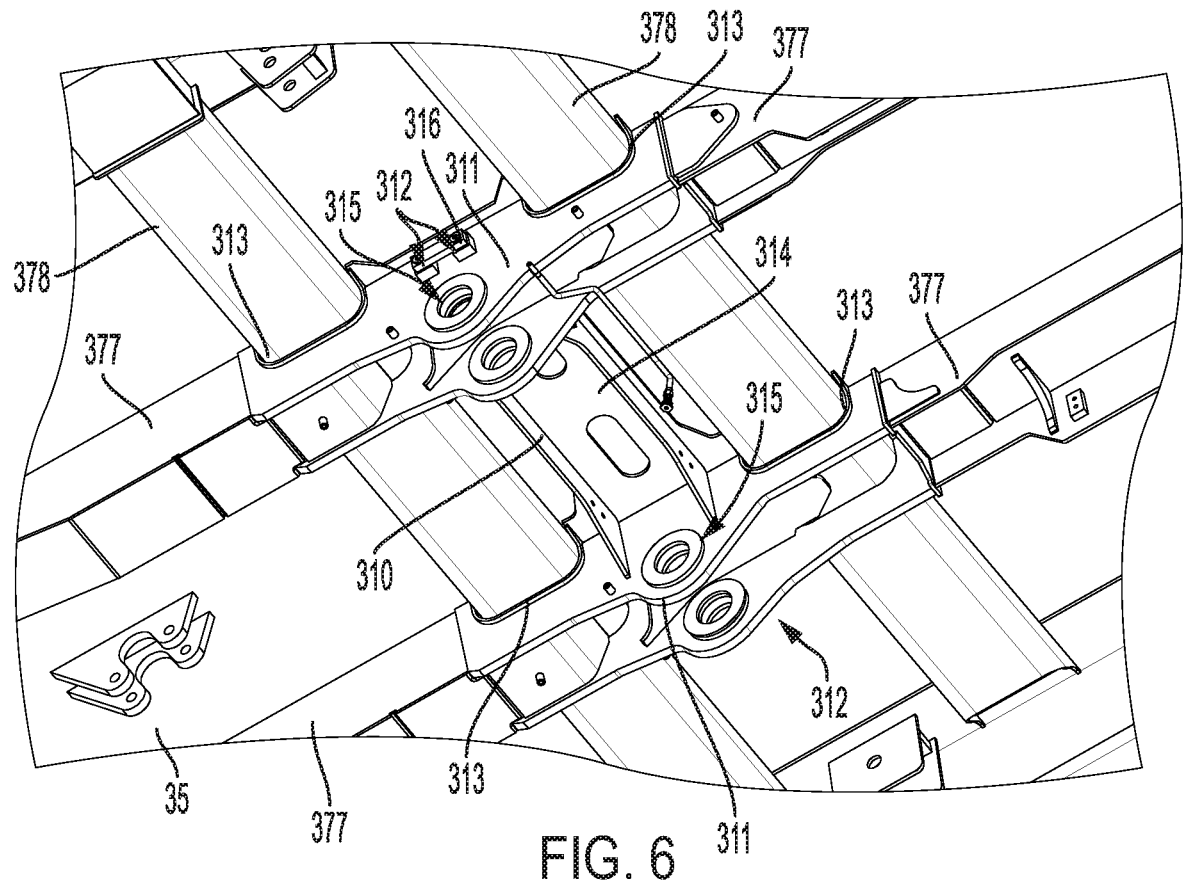
FIG. 6 is an enlarged view of a bottom portion of the dump body of FIG. 4, particularly showing a rear pivot support according to embodiments of the disclosed subject matter.

The rear pivot support 310 can be provided at the rear portion 34 of the dump body 30, such as shown in FIG. 5. The rear pivot support 310 can have a pair of rear pivots 311. The rear pivots 311 can be spaced apart from each other in a width or lateral direction of the dump body 30, such as shown in FIGS. 4-6. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 6, for instance, each rear pivot 311 can be welded in-line with the corresponding longitudinal body support member 377. Thus, the rear pivot 311 can be considered as part of the longitudinal body support member 377 (i.e., integral and/or one-piece with).

Figure 7:
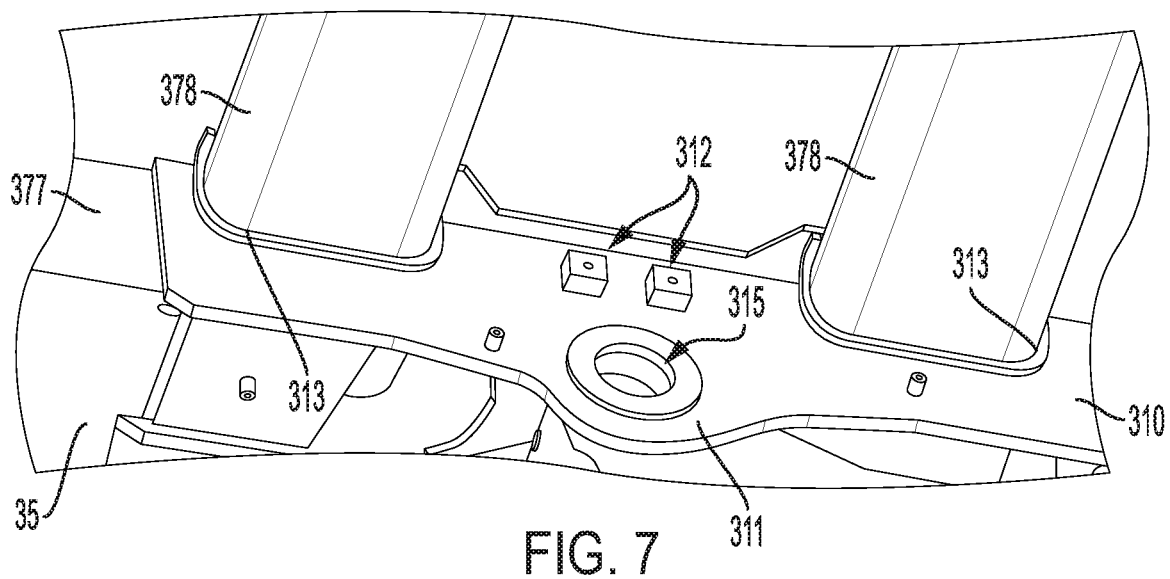
FIG. 7 is another enlarged view of a portion of the rear pivot support of FIG. 6.
Figure 8:
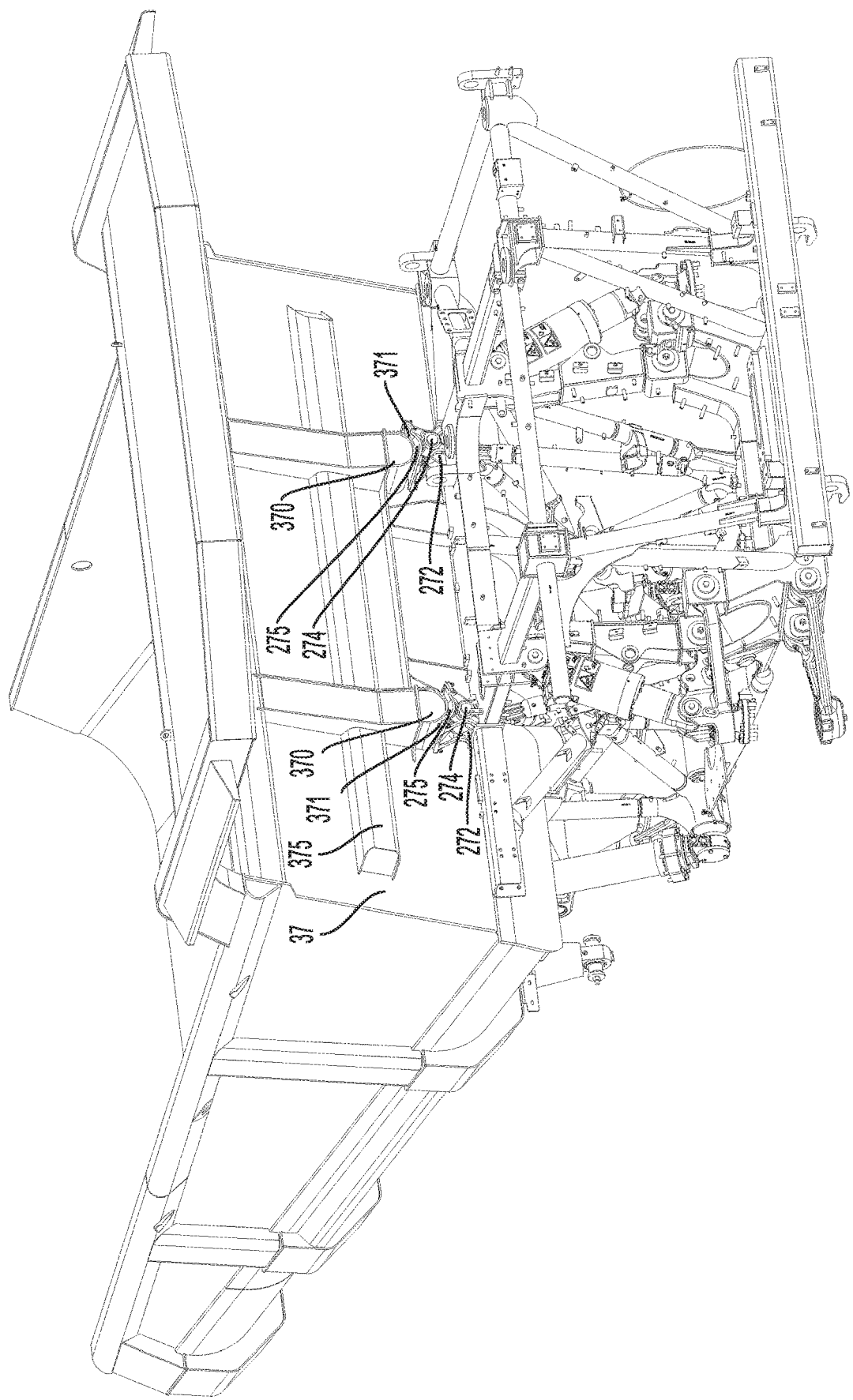
FIG. 8 is a front, side view of the dump body positioned on the space frame according to embodiments of the disclosed subject matter.

As shown in FIG. 6 and FIG. 7, each rear pivot 311 can also include a plurality of cut-outs 313, for instance, two cut-outs 313, spaced apart from each other in a length direction of the dump body 30. Each cut-out 313 can receive or accept a transverse body support member 378. Moreover, the cut-outs 313 of one of the rear pivots 311 can receive different transverse body support members 378, for instance, adjacent transverse body support members 378, such as shown in FIG. 6 and FIG. 7. Additionally, as shown, each transverse body support member 378 can extend through one cut-out 313 of one rear pivot 311 and through an opposing cut-out 313 of the other rear pivot 311.

Each rear pivot 311 can have a pivot bore 315. FIG. 6, for instance, shows each rear pivot 311 having a pivot bore 315 with two aligned, spaced-apart pivot bore portions. The pivot bore 315 of one rear pivot 311 can be aligned with the pivot bore 315 of the other rear pivot 311 in the width direction of the dump body 30. Thus, the pivot bores 315 can have a common axis. In that the pivot bores 315 can be circular openings, the portion (or portions) of the rear pivot 311 forming the pivot bore 315 can be considered cylindrical.

According to one or more embodiments of the disclosed subject matter, the rear pivots 311 can also include an attachment interface 312 on an outer side surface thereof, such as shown in FIG. 6 and FIG. 7. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in the pivot bore 315 of the rear pivot 311 (e.g., between the two pivot bore portions of a single rear pivot 311) such that the pivot bore 212 of the rear support 211 is aligned with the pivot bore 315 and such that a pin of the pivot pin interface 213 extends through the pivot bore 212 of the rear support 211 and the pivot bore 315 of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket 316 can be fixedly or removably coupled to one or more projections of the attachment interface 312, over the arm 214 of the pivot pin interface 213, to prevent the pivot pin interface 213 from moving laterally outward from the rear pivot 311. The bracket 316 can be fixed to the projection(s) of the attachment interface 312 via bolts, rivets, or welding as non-limiting examples.

The bottom 35 of the dump body 30 can include the plurality of flat contact surfaces 301, such as shown in FIG. 4 and FIG. 5. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 4 and FIG. 5. Moreover, the flat contact surface 301 on one longitudinal support body member 377 can be spaced apart from the flat contact surface 301 on the opposing longitudinal support body member 377 in the width direction of the dump body 30. Hence, FIG. 4 and FIG. 5 show only one flat contact surface 301 (though this surface may including multiple flat contact surface portions as discussed below), the other being provided on the inward-facing surface of the near longitudinal support body member 377. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 5. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 5 may constitute the flat contact surface 301.

Figure 9:
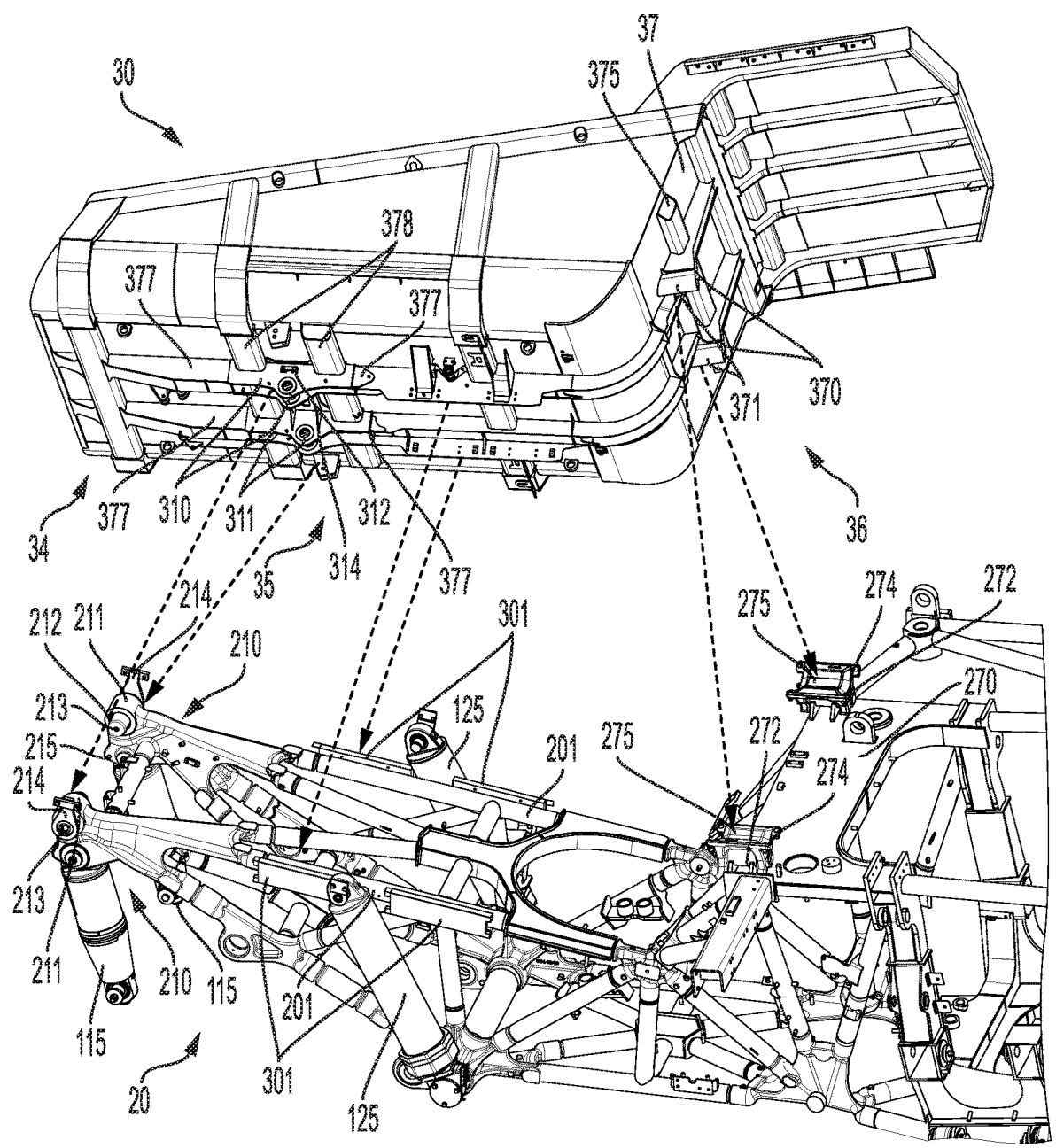
FIG. 9 is an exploded view of the space frame and dump body to show defined contact points according to embodiments of the disclosed subject matter.

Discussed in more detail below, when the dump body 30 is in a lowered position (i.e., rest position), the flat contact surfaces 301 attached to the dump body 30 can be positioned as shown in FIG. 9. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 20 degrees or less from vertical. According to one or more embodiments, in the side view of the dump body 30 some surfaces may be at one vertical angle and other surfaces may be at another vertical angle. For instance, an upper front surface portion of the vertical support structure 370 may be at an angle 20 degrees from vertical and a lower front surface portion, which may include the bottom portion forming the down-facing contact surfaces 317, can be at or about vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, such as shown in FIGS. 2, 4, 5, 8, and 9, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to space frame and body support arrangements for haul trucks, and systems, components, and methods thereof. Embodiments of the disclosed subject matter can provide a lightweight, durable machine configuration with a reliable support definition of load points between the dump body 30 and the space frame 20, for instance, in light of dimensional variations due to tolerances and/or component deflection.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by the lift cylinders 125, which may be coupled to the center lower frame connections 220.

Referring to FIG. 9, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 9. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 270 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Indeed, optionally, all of the vertical loading can go through or be shared by the pivot pins 273 and the support rockers 274. To some extent the vertical support structures 370 can provide support for horizontal components of force vectors with respect to the dump body 30 load being transferred through the space frame 20 and the front suspension system to the front wheels 14 based on the incline or offset of the pivot axis of the support rocker 274 relative to the vertical centerline of the vertical support structure 370, though the second pair of contact points discussed above can take up the horizontal loading.

Additionally, because the support rockers 274 can pivot laterally and independently of each other, and because both the support rockers 274 and the vertical support structures 370 have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally). The pivoting of the support rockers 274 can also allow the support rocker 274 to take into account any tolerance stackup in the dump body 30 and space frame 20. Additionally, uniform bend radius of the support rocker 274 can ensure load transfer is directed back to center of the pivot pin 273 in an effort to reduce or eliminate bending moments.

Additionally shown in FIG. 2, in a front view the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 274/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An off-highway rear haul truck comprising:
a space frame, the space frame having a length and a width and including:
a pair of cylindrical rear supports at a rear of the space frame, the cylindrical rear supports having a first common axis and being spaced apart from each other in a width direction of the space frame,
a pair of outer frame tubes, the outer frame tubes extending lengthwise generally horizontally in a length direction of the space frame, and
a pair of support rockers, the support rockers being spaced apart from each other in the width direction of the space frame and configured to pivot in the width direction of the space frame about respective axes, the axes being parallel to each other and orthogonal to the first common axis of the cylindrical rear supports; and
a dump body contacting the space frame according to a six-point contact arrangement, the dump body having a length and a width and including:
a rear pivot support provided on a bottom the dump body and toward a rear of the dump body, the rear pivot support having a pair of cylindrical rear pivots, the cylindrical rear pivots having a second common axis and being spaced apart from each other in a width direction of the dump body,
a pair of flat contact surfaces provided on the bottom of the dump body at a middle portion of the dump body, the flat contact surfaces being spaced apart from each other in the width direction of the dump body, and
a pair of vertical support structures extending from a front face of the dump body, the pair of vertical support structures being spaced apart from each other in the width direction of the dump body,
wherein the six-point contact arrangement includes the pair of cylindrical rear supports of the space frame pivotally coupled to the pair of cylindrical rear pivots of the rear pivot support of the dump body, the pair of vertical support structures of the dump body removably seated in the pair of support rockers, and the pair of flat contact surfaces positioned adjacent outer lateral surfaces of the pair of outer frame tubes.

2. The off-highway rear haul truck according to claim 1, wherein, in a front view of the off-highway rear haul truck, one support rocker-vertical support structure combination is located along a first longitudinal axis of a first front suspension strut, another support rocker-vertical support structure combination is located along a second longitudinal axis of a second front suspension strut, and the first and second longitudinal axes intersecting at a point on a centerline of the dump body at a top of the dump body.

3. The off-highway rear haul truck according to claim 1, wherein each of the support rockers has an upward-facing semi-cylindrical contact surface, each of the vertical support structures has a down-facing semi-cylindrical contact surface, and the down-facing semi-cylindrical contact surfaces of the vertical support structures are respectively seated in the upward-facing semi-cylindrical contact surfaces of the support rockers.

4. The off-highway rear haul truck according to claim 1, wherein each of the flat contact surfaces is comprised of a first flat contact surface portion and a second flat contact surface portion spaced from the first flat contact surface portion in a length direction of the dump body.

5. The off-highway rear haul truck according to claim 1, wherein the bottom of the dump body includes at least two transverse body support members that extend in the width direction of the dump body, and a plurality of longitudinal body support members that extend in a length direction of the dump body, and
wherein the rear pivot support is provided on the bottom of the dump body such that the cylindrical rear pivots are in line with respective ones of the longitudinal body support members and such that the at least two transverse body support members cross the rear pivot support.

6. The off-highway rear haul truck according to claim 1, wherein the six-point contact arrangement is provided when the dump body of the off-highway rear haul truck is in a rest position.

7. The off-highway rear haul truck according to claim 1, wherein, in a front view of the off-highway rear haul truck, for each vertical support structure/support rocker combination, a vertical centerline axis of a down-facing contact surface of the vertical support structure is offset inward in a width direction of the off-highway rear haul truck from the pivot axis of the support rocker.

8. A support system for a haul truck comprising:
   a space frame including:
      a pair of rear supports at a rear of the space frame, the rear supports being spaced apart from each other in a width direction of the space frame,
      a pair of outer frame tubes extending lengthwise generally horizontally, and
      a pair of support rockers, the support rockers being spaced apart from each other in the width direction of the space frame and configured to pivot laterally about respective axes, the axes being parallel to each other; and
   a dump body operatively positioned on the space frame and including:
      a rear pivot support provided on a bottom the dump body, the rear pivot support having a pair of rear pivots spaced apart from each other in a width direction of the dump body,
      a pair of flat contact surfaces provided on the bottom of the dump body, the flat contact surfaces being vertically oriented and spaced apart from each other in the width direction of the dump body, and
      a pair of vertical support structures extending from a front face of the dump body, the pair of vertical support structures being spaced apart from each other in the width direction of the dump body, and each vertical support structure having a down-facing contact surface,
   wherein the rear supports of the space frame are pivotally coupled to the rear pivots of the rear pivot support of the dump body, the vertical support structures of the dump body are removably seated in the support rockers, and the flat contact surfaces are positioned adjacent outer lateral surfaces of the outer frame tubes when the dump body of the haul truck is in a rest position.

9. The support system according to claim 8, wherein, in a front view of the support system, a first support rocker-vertical support structure combination is located along a first longitudinal axis of a first front suspension strut, a second support rocker-vertical support structure combination is located along a second longitudinal axis of a second front suspension strut, and the first and second longitudinal axes intersect at a point on a vertical centerline at a top of the dump body.

10. The support system according to claim 8, wherein each of the support rockers has an upward-facing concave contact surface, and each of the vertical support structures has a down-facing convex contact surface, said down-facing convex contact surface being seated in the upward-facing concave contact surface.

11. The support system according to claim 8, wherein each of the flat contact surfaces is comprised of a first flat contact surface portion and a second flat contact surface portion spaced from the first flat contact surface portion in a length direction of the dump body.

12. The support system according to claim 8,
   wherein the bottom of the dump body includes at least two transverse body support members that extend in the width direction of the dump body, and a plurality of longitudinal body support members that extend in a length direction of the dump body, and
   wherein the rear pivot support is provided on the bottom of the dump body such that the rear pivots are in line with respective ones of the longitudinal body support members and such that the at least two transverse body support members cross the rear pivot support.

13. The support system according to claim 8, wherein in a front view of the support system, for each vertical support structure/support rocker combination, a vertical centerline axis of the down-facing contact surface of the vertical support structure is offset inward in a width direction of the support system from the pivot axis of the support rocker.

* * * * *